United States Patent
Srimal et al.

(10) Patent No.: US 11,914,587 B2
(45) Date of Patent: Feb. 27, 2024

(54) SYSTEMS AND METHODS FOR KEY-BASED INDEXING IN STORAGE DEVICES

(71) Applicant: Western Digital Technologies, Inc., San Jose, CA (US)

(72) Inventors: Niraj Srimal, Bangalore (IN); Adarsh Sreedhar, Bangalore (IN); Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 171 days.

(21) Appl. No.: 17/500,125

(22) Filed: Oct. 13, 2021

(65) Prior Publication Data

US 2023/0113460 A1 Apr. 13, 2023

(51) Int. Cl.
*G06F 16/2453* (2019.01)
*G06F 16/22* (2019.01)

(52) U.S. Cl.
CPC .... *G06F 16/24532* (2019.01); *G06F 16/2246* (2019.01)

(58) Field of Classification Search
CPC .............. G06F 16/24532; G06F 16/2246
See application file for complete search history.

(56) References Cited

U.S. PATENT DOCUMENTS

| | | | |
|---|---|---|---|
| 7,949,845 B2 | 5/2011 | Sinclair et al. | |
| 9,454,477 B2 | 9/2016 | Colgrove et al. | |
| 10,482,087 B2 | 11/2019 | Jo | |
| 10,990,574 B2 | 4/2021 | Verma | |
| 2008/0147968 A1* | 6/2008 | Lee | G06F 11/1068 711/E12.008 |
| 2010/0169274 A1* | 7/2010 | Kulkarni | G06F 16/22 711/216 |
| 2011/0225165 A1* | 9/2011 | Burstein | G06F 16/2272 707/741 |
| 2013/0013606 A1* | 1/2013 | Stanfill | G06F 16/213 707/E17.002 |
| 2013/0235031 A1* | 9/2013 | Karras | G06T 17/005 345/419 |
| 2013/0262745 A1* | 10/2013 | Lin | G06F 3/0679 711/E12.008 |
| 2015/0016172 A1* | 1/2015 | Loh | G06F 3/0608 365/51 |
| 2017/0139594 A1 | 5/2017 | Ahn et al. | |
| 2018/0357277 A1* | 12/2018 | Erdmann | G06F 16/2255 |
| 2019/0018613 A1* | 1/2019 | Byun | G06F 3/061 |
| 2021/0209086 A1* | 7/2021 | Kussmaul | G06F 16/316 |

OTHER PUBLICATIONS

Wang, et al., "SSD In-Storage Computing for Search Engines," 2016, In IEEE Transactions on Computers, Sep. 13, 2020, 14 pages.

* cited by examiner

*Primary Examiner* — Huawen A Peng
(74) *Attorney, Agent, or Firm* — Michael Best & Friedrich LLP

(57) ABSTRACT

A data storage device includes a non-volatile memory device including one or more memory dies and a controller. The controller is configured to receive a pseudocode file and a search key from one or more external devices and perform an index search based on the received pseudocode and search key. The controller may further determine a data file associated with the performed index search and output the determined data file to the one or more external device.

18 Claims, 5 Drawing Sheets

SYSTEMS AND METHODS FOR KEY-BASED INDEXING IN STORAGE DEVICES

FIELD

This application relates generally to data storage devices, and more particularly, to data storage devices configured to perform index searches.

BACKGROUND

Indexing is a technique for performing fast and efficient retrieval records from a database file. Indexing takes a search key as an input and returns a collection of matching records associated with the search key. Complex indexing techniques are commonly used in database management systems and/or Big Data applications, where a primary index does not fit in memory, thereby providing efficient access to the data and helping in reducing the total number of operations needed to retrieve the data.

The retrieval of data and associated indexing is generally managed by a host device, which reads several tables or indexes using the searching key in order to get the desired data. However, this requires multiple data transfers between the host device and the data storage device and requires host device resources to process the tables and route the flow of data. Further, as the indexing data must be exposed to the host device, there is a loss in security of the data within the data storage device.

SUMMARY

Performing indexing operations on a data storage device allows for the load on a host device to be reduced and requires fewer data transfers and associated synchronizations between a host device and a data storage device, thereby decreasing latency associated with performing an index search operation. Further, by performing indexing operations on a data storage device, parallel processing techniques may be used to further improve efficiency and reduce latency associated with an index search. Also, by performing indexing operations on a data storage device, indexing data is not exposed outside of the data storage device, such as to the host device, thereby improving data security.

One embodiment of the present disclosure includes a data storage device which includes a non-volatile memory device including one or more memory dies and a controller. The controller is configured to receive a pseudocode file from one or more external devices and a search key from the one or more external device. The controller is further configured to perform an index search based on the received binary pseudocode file and the received search key, determine a data file stored in the one or more memory dies associated with the performed index search, and output the data file to the one or more external devices.

Another embodiment of the present disclosure includes a method performed by a data storage device having a controller coupled to a non-volatile memory device. The method includes receiving a pseudocode file and a search key from the one or more external devices. The method also includes performing an index search based on the received binary pseudocode file and the received search key, determining a data file associated with the performed index search, and outputting the data file to the one or more external devices.

Another embodiment of the present disclosure includes an apparatus. The apparatus includes means for receiving a pseudocode file and a search key from one or more external devices. The apparatus further includes means for performing an index search based on the received binary pseudocode file and the received search key and means for determining a data file associated with the performed index search. The apparatus also includes means for outputting the data file to the one or more external devices.

Various aspects of the present disclosure provide for data storage devices configured to perform various index searches based on a received pseudocode file and search key from a host device. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, DRAM, etc.

Figure 1:
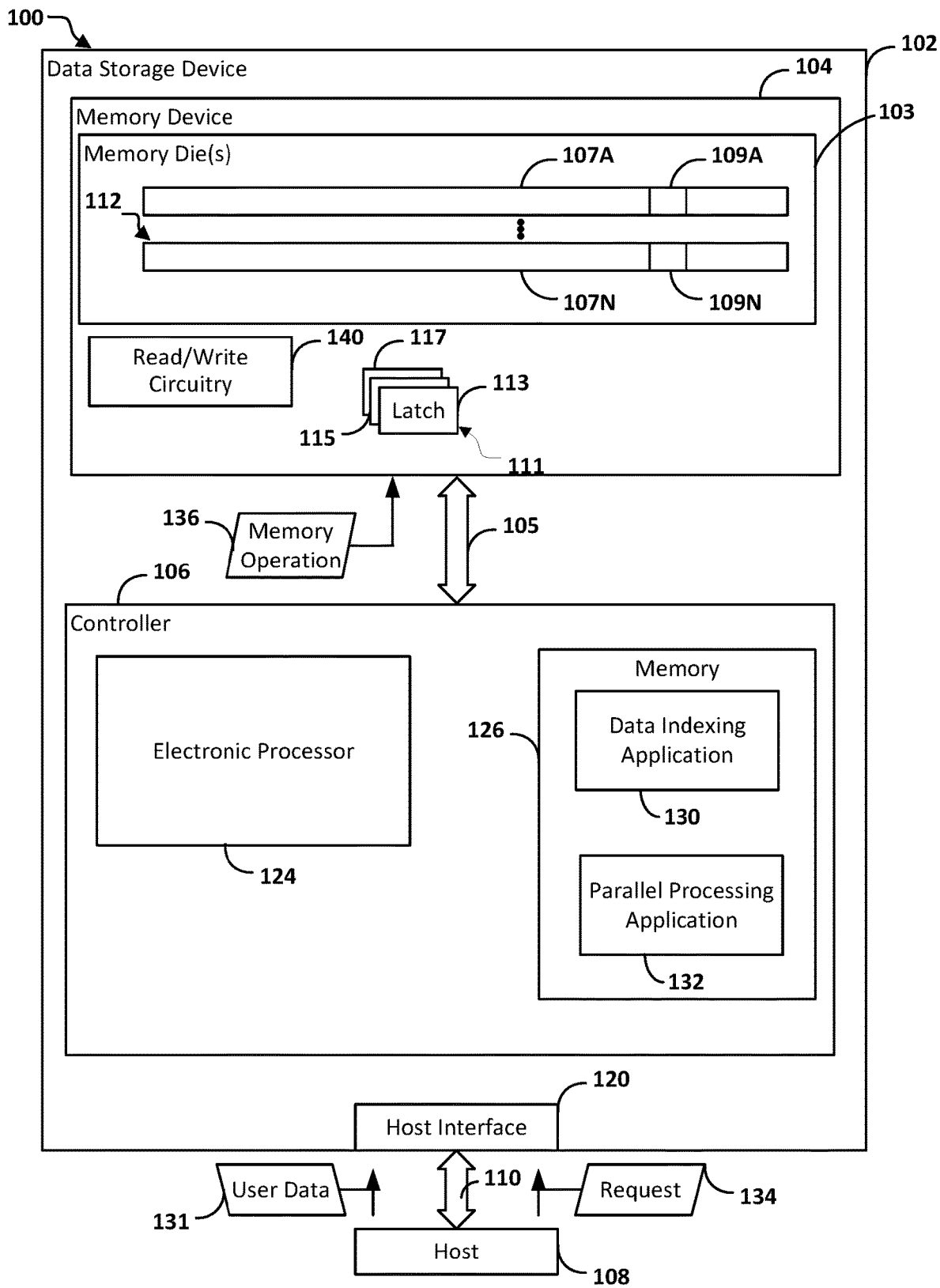
FIG. 1 is a block diagram illustrating one example of a system including a data storage device, according to some embodiments.

FIG. 1 is a block diagram of one example of a system 100 that includes memory device indexing features, in accordance with some embodiments of the disclosure. In the example of FIG. 1, the system 100 includes a data storage device 102 in communication with one or more external host devices 108. The data storage device 102 includes one or more memory devices 104 (e.g. non-volatile memory) that are coupled to a controller 106.

One example of the structural and functional features provided by the controller 106 are illustrated in FIG. 1. However, the controller 106 is not limited to the structural and functional features provided by the controller 106 in FIG. 1. The controller 106 may include fewer or additional structural and functional features that are not illustrated in FIG. 1.

The data storage device 102 and the one or more host devices 108 may be operationally coupled through a connection (e.g., a communication path 110), such as a bus or a wireless connection. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, a cloud storage drive, or other suitable storage drives.

The data storage device 102 may be configured to be coupled to the host device 108 using the communication path 110, such as a wired communication path and/or a wireless communication path. For example, the data storage device 102 may include an interface 120 (e.g., a host interface) that enables communication using the communication path 110 between the data storage device 102 and the host device 108, such as when the interface 120 is communicatively coupled to the host device 108. In some examples, the host device 108 may provide power to the data storage device 102. For example, the host device 108 may provide one or more regulated voltages to the data storage device 102, such as 12 VDC, 5 VDC, 3.3 VDC, etc.

The host device 108 may include a processor and a memory. The memory may be configured to store data and/or instructions that may be executable by the processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to the memory device 104 of the data storage device 102. For example, the host device 108 may be configured to provide data, such as user data 131, to be stored at the memory device 104 or to request data to be read from the memory device 104. The host device 108 may include a mobile smartphone, a music player, a video player, a gaming console, an electronic book reader, a personal digital assistant (PDA), a computer, such as a laptop computer or notebook computer, any combination thereof, or other suitable electronic device.

The host device 108 communicates using a memory interface 120 that enables reading from the memory device 104 and writing to the memory device 104. In some examples, the host device 108 may operate in compliance with an industry specification, such as a Universal Flash Storage (UFS) Host Controller Interface specification. In other examples, the host device 108 may operate in compliance with one or more other specifications, such as a Secure Digital (SD) Host Controller specification or other suitable industry specification. The host device 108 may also communicate with the memory device 104 in accordance with any other suitable communication protocol.

The memory devices 104 of the data storage device 102 may include a non-volatile memory (e.g., NAND, NOR, BiCS family of memories, or other suitable memory). In some examples, the memory device 104 may be any type of flash memory. For example, the memory device 104 may be two-dimensional (2D) memory or three-dimensional (3D) flash memory. The memory device 104 may include one or more memory dies 103. In some of the embodiments, individual memory dies 103 or groups of memory dies 103 may be referred to as arrays. Each of the one or more memory dies 103 may include one or more memory blocks 112 (e.g., one or more erase blocks). Each memory block 112 may include one or more groups of storage elements, such as a representative group of storage elements 107A-107N. The group of storage elements 107A-107N may be configured as a wordline. The group of storage elements 107A-107N may include multiple storage elements (e.g., memory cells that are referred to herein as a "string"), such as a representative storage elements 109A and 109N, respectively.

The memory device 104 may include support circuitry, such as read/write circuitry 140. Although depicted as a single component, the read/write circuitry 140 may be divided into separate components of the memory device 104, such as read circuitry and write circuitry. The read/write circuitry 140 may be external to the one or more memory dies 103 of the memory device 104. Alternatively, one or more individual memory dies 103 may include corresponding read/write circuitry 140 that is operable to read from and/or write to storage elements within the individual memory die, independent of any other read and/or write operations at any of the other memory dies. For example, the read/write circuitry 140 may be configured to perform various read/write operations such as initial writing to volatile memory, array commit functions, and other functions as required for a given application. The memory device 104 may further include one or more latches (e.g., a set of latches 111 including latches 113, 115, and 117).

The controller 106 is coupled to the memory device 104 (e.g., the one or more memory dies 103) using a bus 105, an interface (e.g., interface circuitry), another structure, or a combination thereof. For example, the bus 105 may include multiple distinct channels to enable the controller 106 to communicate with each of the one or more memory dies 103 and/or memory devices 104 in parallel with, and independently of, communication with the other memory dies 103 and/or memory devices 104.

The controller 106 is configured to receive data and instructions from the host device 108 and to send data to the host device 108. For example, the controller 106 may send data to the host device 108 using the interface 120, and the controller 106 may receive data from the host device 108 using the interface 120. The controller 106 is configured to send data and commands (e.g., the memory operation 136, which may be a cycle operation of a memory block of the memory device 104) to the memory device 104 and to receive data from the memory device 104. For example, the controller 106 is configured to send data and a program or write command to cause the memory device 104 to store data to a specified address of the memory device 104. The write command may specify a physical address of a portion of the memory device 104 (e.g., a physical address of a word line of the memory device 104) that is to store the data, as well as a size (e.g. 2 k, 4 k, etc.) of the data to be written.

The controller 106 is further configured to send a read command to the memory device 104 to access data from a specified address of the memory device 104. The read command may specify the physical address of a region of the memory device 104 (e.g., a physical address of a word line of the memory device 104), as well as a size (e.g. 2 k, 4 k, etc.) of the data to be read. As will be described in more detail below, the controller 106 may further be configured to process received read commands by executing one or more indexing functions in response to one or more search or index keys received from the host devices 108.

The controller 106 may also be configured to send data and commands to the memory device 104 associated with background scanning operations, garbage collection operations, and/or wear-leveling operations, or other suitable memory operations.

The controller 106 may include a processor 124, a memory 126, and other associated circuitry. The memory 126 may be configured to store data and/or instructions that may be executable by the processor 124. The memory 126 may include a data indexing application 130 and/or a parallel processing application 132 among other applications, programs, etc. The data indexing application 130 may be a hardware circuit or instructions that are executable by the processor 124. Similarly, the parallel processing application 132 may be a hardware circuit or instructions that are executable by the processor 124. While shown as being stored in the memory 126, in some examples the data indexing application 130 and/or the parallel processing application 132 may be configured as a circuit within the controller 106 and/or memory device 104.

The data indexing application 130 may be configured to execute one or more data read indexing operations. For example, the data indexing application 130 may receive one or more index keys from the host devices 108 and perform multi-level indexing operations to retrieve data associated with the received index keys. In some examples, the multi-level indexing may be performed based on pseudocode received from the host devices 108. The operations of the data indexing application 130 will be described in more detail below.

The parallel processing application 132 may be configured to work with the data indexing application 130 to perform one or more parallel processing techniques when accessing the one or more memory dies 103 and/or memory devices 104. For example, the parallel processing application 132 may execute one or more parallel processing operations, such as die interleaving and/or asynchronous independent plane read ("AIPR") operations, as will be described in more detail below. While the parallel processing application 132 is shown as a separate application than the data indexing application 130, in some embodiments, the parallel processing application 132 may be integrated with the data indexing application 130.

Figure 2:
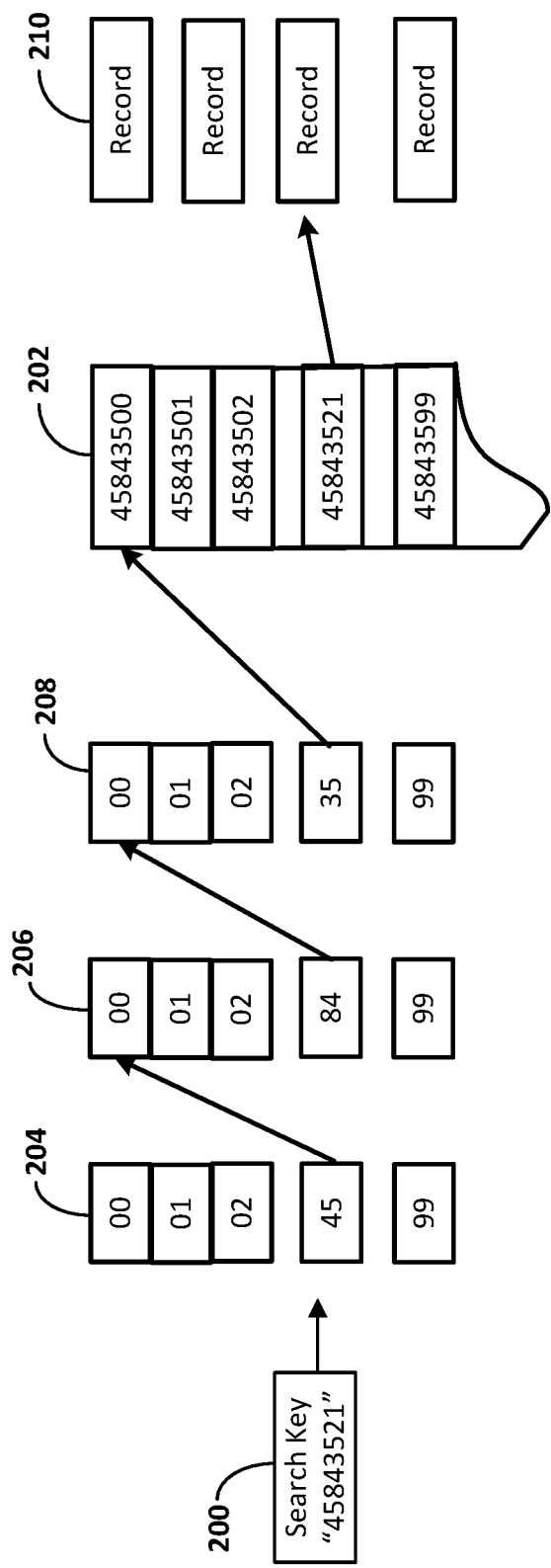
FIG. 2 is a diagram illustrating one example of a multi-level indexing, according to some embodiments.

Generally, data indexing operations are performed on the host device 108. As will be described in more detail below, data indexing operations used with data storage devices, such as data storage device 102, generally use multi-level indexing operations when dealing with large amounts of data. By using data indexing, and particularly multi-level indexing, large sequential data files may be more quickly accessed. Turning now to FIG. 2, an example of a multi-level indexing operation is shown, according to some embodiments. As shown in FIG. 2, a search key 200 associated with a data record is requested. As will be described in more detail below, the search key 200 may be received by the data storage device 102 from the one or more host devices 108. As shown in FIG. 2, the search key 200 value is 45843521, which is associated with a specific data record associated with that particular search key 200. For the sake of the example, it can be assumed that a data index 202 includes more than 50,000,000 data index values. Sequentially searching 50,000,000 or more index values within one or more memory devices 104 to find the associated data is computationally intensive as many indexes (in this case, 45+ million) may have to be searched before the desired index value is found. Multi-level indexing reduces the computational effort required to perform index searching by breaking the main index down into multiple indexes.

The example shown in FIG. 2 is a three level (n+3) multi-level index. The first index 204 is associated with the two most significant digits of the overall index value. For example, where the search key 200 is 45843521, the first two digits (45) will be in the first index 204. Thus, only 100 records or index values have to be searched to find the first two digits of the search key 200. The first index 204 may then point to a second index 206 which includes the third and fourth most significant digits associated with the first two digits (i.e. 45XX). A search of the second index 206 is then searched until the index value 84 (i.e. 4584) is found. The second index 206 may then point to a third index 208 including the fifth and sixth most significant digits associated with the first four digits (i.e. 4584XX) of the search key 200 (e.g. 35). A search of the third index 208 is then searched until the index value 35 (i.e. 458435) is found. The third index 208 may then point to an area of the index 202 where all index values start with 458435, thereby requiring no more than 100 records to be searched within the index 202 to find the desired search key 200 of 45843521. The example shown in FIG. 2 illustrates one possible example of a multi-level index search. Additional index searching algorithms and/or tools, such as hashing and/or sorting algorithms, can allow for improvements in searching each index, such as indexes 204, 206, and 208, by eliminating the need for a host device 108 and/or data storage device 102 to sequentially search each index for the desired index value. In some examples, static mapping of each index, such as indexes 204, 206, and 208, may allow for the desired index value within each index to be directly mapped during an indexing operation.

A record 210 associated with the search key 200 may then be retrieved. While the example of FIG. 2 shows an n+3 multi-level index, it is contemplated that multi-level indexes of more than n+3 or less than n+3 may also be used as required for a given application. Furthermore, the values and sizes of the multi-level index of FIG. 2 are for illustrative purposes only, and it is understood that indexes of various sizes and values may be used with a multi-level index.

Figure 3:
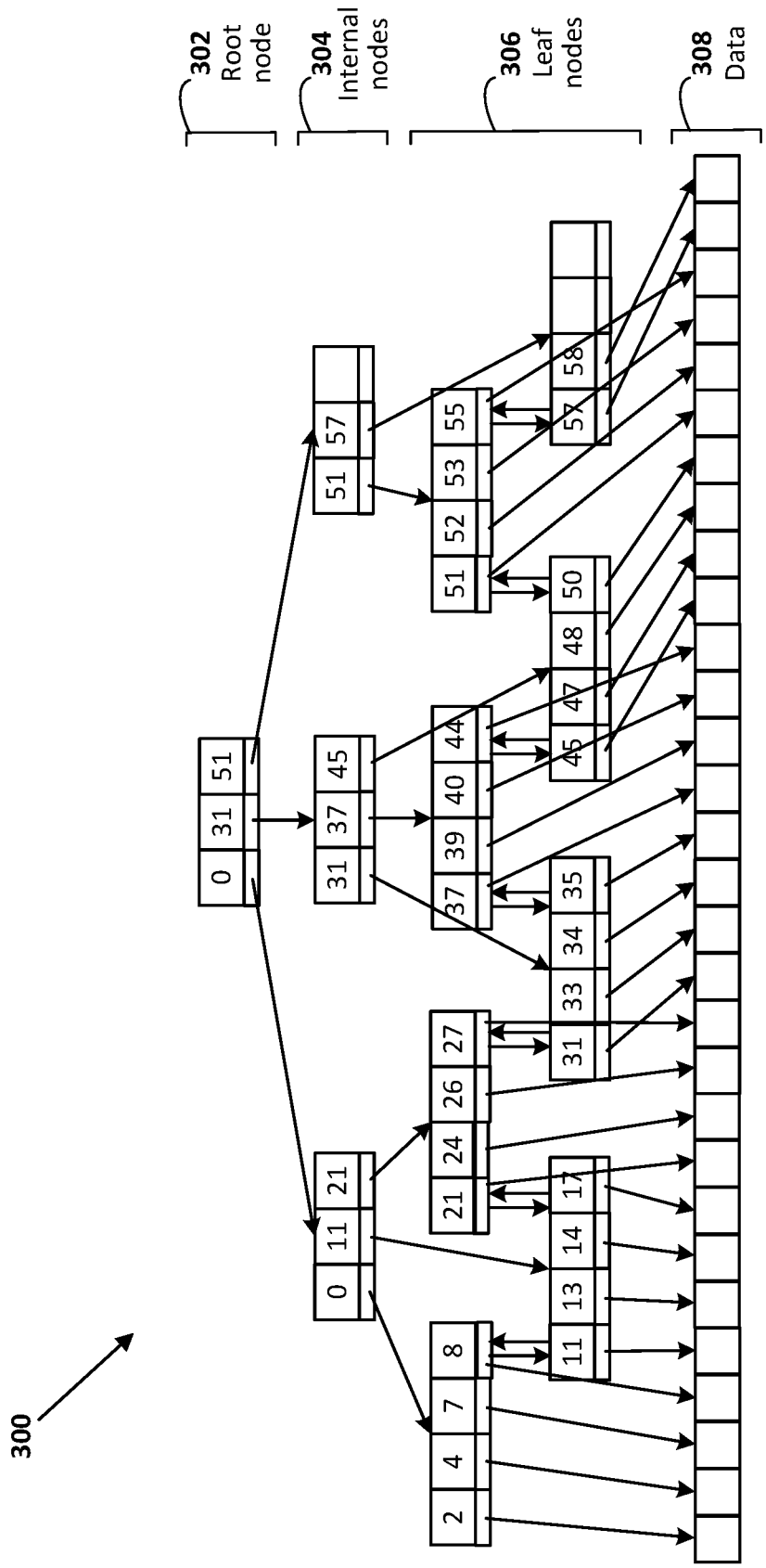
FIG. 3 is a diagram illustrating one example of a B+ tree indexing architecture, according to some embodiments.

Turning now to FIG. 3, another example of a multi-level index is shown. Specifically, FIG. 3 shows an example B+ tree indexing architecture 300. A B+ tree is a variation of a B-tree, in which each node contains only keys, and to which an additional level is added at the bottom with linked leaves. As shown in FIG. 3, the B+ tree indexing architecture 300 includes a highest-level root node 302, three internal nodes 304, and multiple leaf nodes 306.

Each leaf node 306 may be associated with a specific data record 308. B+ Trees are often used in database management systems ("DBMS") and/or Big Data Applications, such as Hadoop. Similar to the multi-level indexing described above, a key may be received and compared first against the root node 302. Based on the key value, an internal node 304 is then provided and searched with regards to the received key. Based on the search of the internal node, a leaf node 306 may be returned, which in turn is searched based on the received key for the exact pointer associated with the desired data record 308.

The above indexing architectures are for example purposes only, and it is contemplated that other types of data indexing architectures may be used by the devices and systems described herein for accessing data, as appropriate for a given application.

Figure 4:
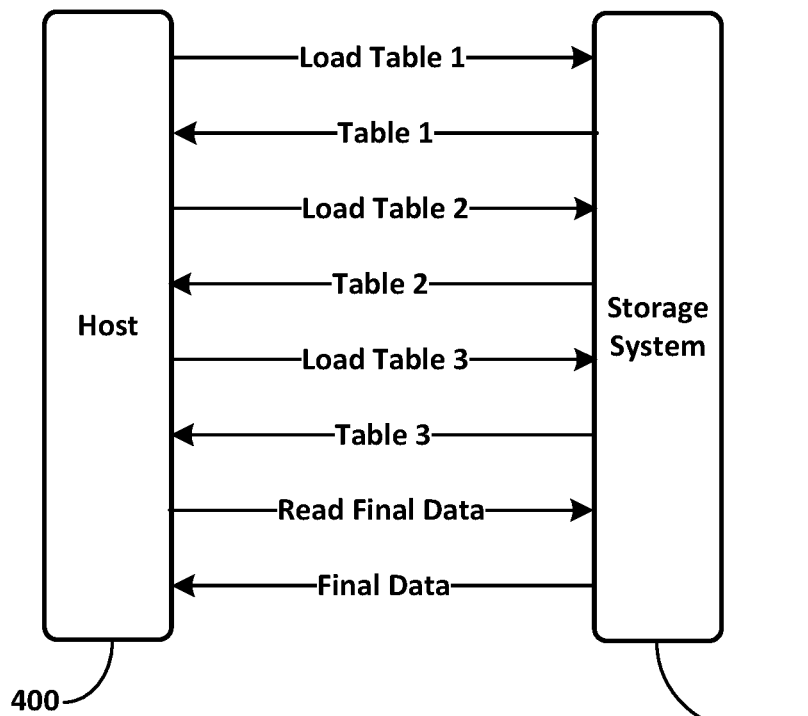
FIG. 4 is a block diagram illustrating a host-based index search.

Turning now to FIG. 4, a block diagram illustrating a general method of performing indexing searching between a host device 400 and a data storage device 402 is shown, according to some embodiments. The host device 400 may be similar to the host device 108 described above. Similarly, the data storage device 402 may be similar to the data storage device 102, described above. As shown in FIG. 4, the host device 400 loads multiple tables into the data storage device 402, and then receives data associated with the tables from the data storage device 102. In one example, each table is an index in a multi-level index architecture. For example, as shown in FIG. 2, three different indexes are required to get to the ultimately desired data. These three indexes may equate to the three tables that are loaded and received by the host device 400 in FIG. 4 prior to the requested data being presented by the data storage device 102. Thus, for each read request four separate interactions between the host device 400 and the data storage device 402 are required. Additionally, the host device 400 must then build and process the indexing information. This both requires additional time (i.e. increased latency) and resources of the host device 400. Furthermore, as the indexes are built on the host device 400, the indexing architecture of the data storage device 402 is exposed to the host device 400 thereby potentially reducing security effectiveness.

Figure 5:
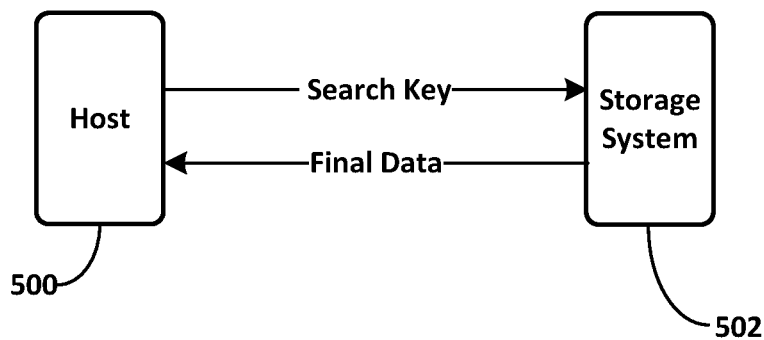
FIG. 5 is a block diagram illustrating a data storage device-based index search, according to some embodiments.

Turning now to FIG. 5, an enhanced method for performing index searching between a host device 500 and a data storage device 502 is shown, according to some embodiments. As shown in FIG. 5, the host device 500 only has to transmit a search key to the data storage device 102, and the index searching is then performed within the data storage device 502, as described in more detail below. The host device 500 may be similar to the host devices 108 described above. Similarly, the data storage device 502 may be similar to the data storage device 102, described above.

By performing the index searching on the data storage device 502, fewer interactions and data flows between the host device 500 and the data storage device 502 are required, thereby decreasing latency. Furthermore, the data storage device 502 may use various data organization techniques, such as AIPR and/or die interleaving, when storing the indexing data, thereby allowing for increased processing efficiency by allowing the data storage device 502 to load relevant data tables/indexes from different dies and/or planes in parallel, thereby reducing the number of memory reads. For example, the data storage device 502 may use die interleaving and/or AIPR to save different portions of the tables/indexes in different dies and/or memory devices, thereby allowing for parallel accessing during a reading operation. Additionally, the indexing architecture of the data storage device 502 is not exposed to the host device 500, thereby increasing security.

Figure 6:
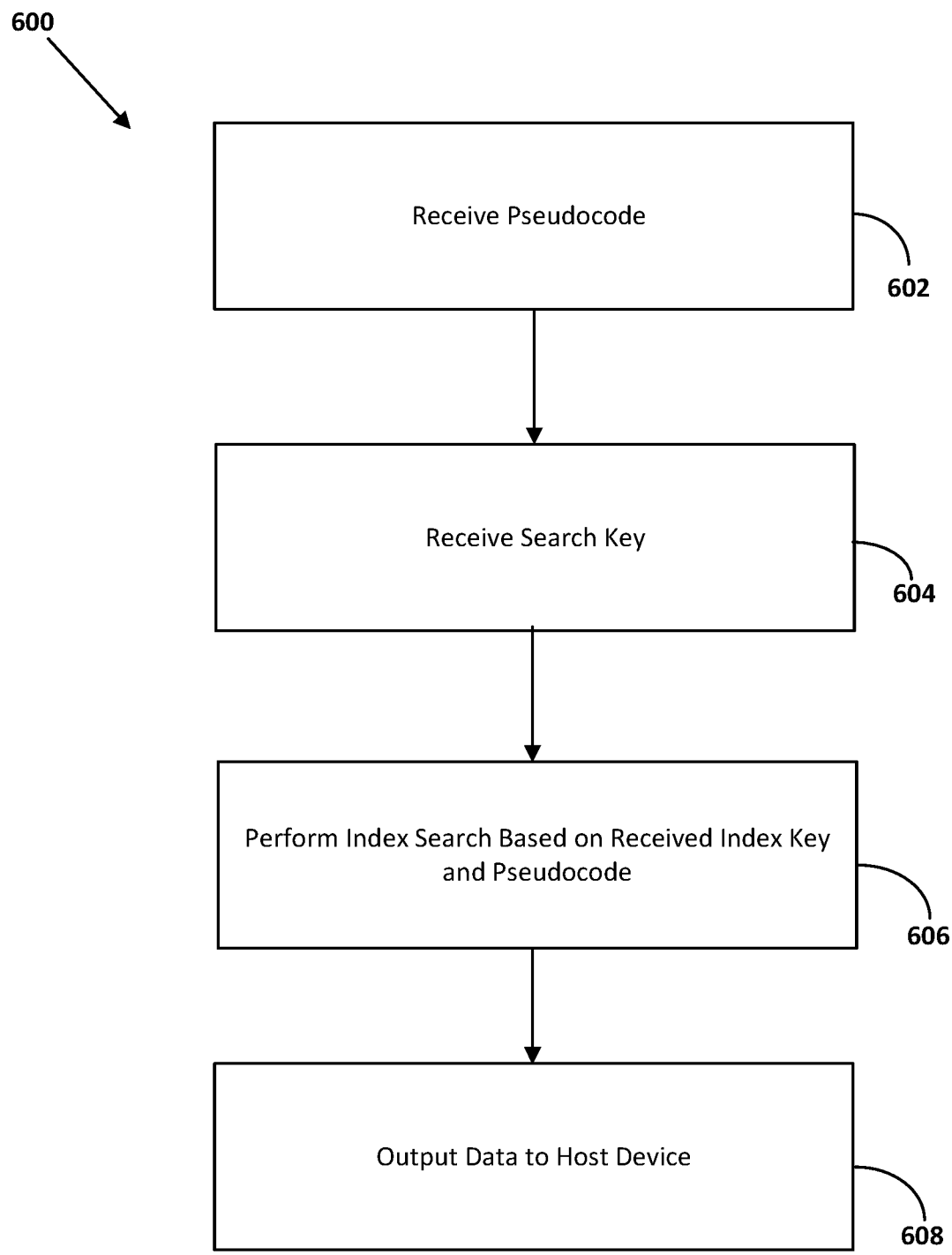
FIG. 6 is a flow chart illustrating a process for performing a data storage device-based index search, according to some embodiments.

Turning now to FIG. 6, a flowchart illustrating a process 600 for performing index searching on a data storage device, such as data storage device 102, is shown according to some embodiments. While the process 600 is described with regards to the system 100 described above, it is understood that the process 600 may be performed by various data storage device types. In some embodiments, the process 600 is performed by the data indexing application 130.

At block 602, the data storage device 102 receives a pseudocode from the host device 108. The pseudocode may be a binary file. In one embodiment, the pseudocode indicates a type of indexing that is required to access the database. For example, the pseudocode may indicate that indexing methods such as multi-level indexing, B+ indexing, or other applicable indexing methods are required to perform a requested read operation. Upon receiving the pseudocode, the data storage device 102 then receives a search key at block 604. The search key may be an address associated with a given data file. For example, as described above with regards to FIG. 2, a search key of 45843521 may be provided. However, any search key may be provided as required to access the required data. In one embodiment, the pseudocode includes instructions on how to process the index tables in the data storage device 102 based on the index key provided by the host device 108. These instructions allow the data storage device to properly process the index tables in view of the received index key. In some examples, the data storage device 102 may be configured to determine a type of indexing used and/or required by the host device 108, in which case a pseudocode may not be required to be provided by the host device 108. For example, during an initial communication or "handshake" between the host device 108 and the data storage device 102, the host device 108 may receive a message or other data from the data storage device 102 indicating that the type of indexing used by the data storage device 102 is the same as the type of indexing required by the host device 108. In response to receiving an indication that the data storage device 102 is using the same type of indexing used by the host device 108, the host device 108 may not send the pseudocode, or may transmit an instruction to the data storage device 102 to use the indexing type currently in use by the data storage device 102.

At block 606 the data storage device 102 performs an index search based on the received index key and pseudocode. As described above, the index search may perform various index searches, such as multi-level indexing, B+ Tree indexing, or other suitable indexing methods. The pseudocode may be configured to instruct the data storage device 102, such as through the data indexing application 130, which type of index search to perform.

In some examples, the data storage device 102 may execute one or more parallel operations to increase the speed of the index searching. For example, where the data storage device 102 is configured to use one or more parallel processing techniques, such as AIPR and/or die interleaving, the latency to perform the requested index search may be decreased. As described above, by using AIPR and/or die interleaving, the data storage device 102 may be able to perform parallel retrievals of multiple indexes to reduce search latency. For example, AIPR and/or die interleaving allows for the data storage device 102 to access data from multiple index tables at different locations in a single sense operation from the memory device 104. This parallel processing is not able to be performed in the case of a host device 108 performing the index searching as the host device 108 must send each index table separately, thereby preventing the data storage device 102 from being able to attempt to access multiple indexes at once. In some embodiments, the parallel processing application 132 may perform the parallel operations in conjunction with the data indexing application 130.

Upon completing the index search at block 606, the data associated with the received search key is output by the data storage device 102 to the host device 108. For example, the data may be provided to the host device 108 via the host interface 120.

In some embodiments, the data storage device 102 may be configured to be in communication with multiple host devices 108 at any given time. As the data storage device 102 performs the index searching, the data storage device 102 can perform multiple index searches at a time. Further, as the index search type is controlled by the pseudocode received from the host devices 108, the index search type may be configurable for each host device 108 in communication with the data storage device 102. Additionally, as the host device 108 does not need to build the index tables, the load on the host devices is reduced.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
   a non-volatile memory device including one or more memory dies; and
   a controller configured to:
      receive a pseudocode file from one or more external devices,
      receive a search key from the one or more external devices,
      perform an index search based on the received pseudocode file and the received search key, wherein a type of index search is controlled by the received pseudocode file,
      determine a data file stored in the one or more memory dies associated with the performed index search, and
      output the data file to the one or more external devices.

2. The data storage device of claim 1, wherein the type of index search is one of a multi-level index search or a B+ tree index search.

3. The data storage device of claim 1, wherein the pseudocode file is a binary file.

4. The data storage device of claim 1, wherein the search key is associated with a memory location of a stored data file.

5. The data storage device of claim 1, wherein the index search is performed using a parallel processing operation.

6. The data storage device of claim 5, wherein the parallel processing operation is one of a die interleaving operation or an asynchronous independent plane read operation.

7. The data storage device of claim 1, wherein the type of index search is an index type required to access data stored in the one or more memory dies.

8. A method performed by a data storage device having a controller coupled to a non-volatile memory device, the method comprising:
   receiving a pseudocode file from one or more external devices;
   receiving a search key from the one or more external devices;
   performing an index search based on the received pseudocode file and the received search key, wherein a type of index search is controlled by the received pseudocode file;
   determining a data file associated with the performed index search; and
   outputting the data file to the one or more external devices.

9. The method of claim 8, wherein the type of index search is one of a multi-level index search and a B+ tree index search.

10. The method of claim 8, wherein the pseudocode file is a binary file.

11. The method of claim 10, wherein the search key is associated with a with a memory location of a stored data file.

12. The method of claim 8, wherein the index search is performed using a parallel processing operation.

13. The method of claim 12, wherein the parallel processing operation is one of a die interleaving operation and an asynchronous independent plane read operation.

14. An apparatus, comprising:
   means for receiving a pseudocode file from one or more external devices;
   means for receiving a search key from the one or more external devices;
   means for performing an index search based on the received pseudocode file and the received search key;
   means for controlling a type of index search based on the received pseudocode file;
   means for determining a data file associated with the performed index search; and
   means for outputting the data file to the one or more external devices.

15. The apparatus of claim 14, wherein the type of index search is one of a multi-level index search and a B+ tree index search.

16. The apparatus of claim 14, wherein the pseudocode file is a binary file.

17. The apparatus of claim 14, further comprising:
means for performing the index search using a parallel processing operation.

18. The apparatus of claim 17, wherein the parallel processing operation is one of a die interleaving operation and an asynchronous independent plane read operation.

* * * * *